United States Patent
Asakura et al.

(10) Patent No.: US 10,030,746 B2
(45) Date of Patent: Jul. 24, 2018

(54) BALL SCREW DEVICE AND STEERING SYSTEM

(71) Applicant: JTEKT CORPORATION, Osaka-shi, Osaka (JP)

(72) Inventors: Toshihiro Asakura, Chiryu (JP); Takuya Nakayama, Okazaki (JP); Keisuke Ogawa, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/600,887

(22) Filed: May 22, 2017

(65) Prior Publication Data

US 2017/0343087 A1     Nov. 30, 2017

(30) Foreign Application Priority Data

May 30, 2016   (JP) ................. 2016-107442

(51) Int. Cl.
*F16H 55/02* (2006.01)
*F16H 25/22* (2006.01)
(Continued)

(52) U.S. Cl.
CPC .......... *F16H 25/2223* (2013.01); *B62D 3/08* (2013.01); *B62D 5/0448* (2013.01); *F16H 25/2233* (2013.01); *B62D 3/02* (2013.01); *B62D 3/04* (2013.01); *B62D 3/06* (2013.01); *F16H 25/18* (2013.01); *F16H 25/20* (2013.01);
(Continued)

(58) Field of Classification Search
CPC ...... F16H 25/2223; F16H 25/18; F16H 25/20; F16H 25/2204; F16H 25/2214; F16H 25/22; B62D 3/08; B62D 3/06; B62D 3/02; B62D 3/04
See application file for complete search history.

(56) References Cited

U.S. PATENT DOCUMENTS

| 6,439,072 B1* | 8/2002 | Kajita | ................. F16H 25/2223 384/43 |
|---|---|---|---|
| 2004/0200303 A1* | 10/2004 | Inoue | ................. F16H 25/2204 74/424.75 |
| 2009/0255752 A1* | 10/2009 | Asakura | .............. F16H 25/2233 180/444 |

FOREIGN PATENT DOCUMENTS

| DE | 199 23 281 A1 | 1/2000 |
|---|---|---|
| EP | 1 426 660 A1 | 6/2004 |

(Continued)

OTHER PUBLICATIONS

Nov. 3, 2017 European Search Report issued in European Patent Application No. EP 17173082.3.

*Primary Examiner* — Zakaria Elahmadi
(74) *Attorney, Agent, or Firm* — Oliff PLC (57) ABSTRACT

A ball screw device is provided, including a retainer that can properly retain balls. The difference between a diameter being the pitch circle diameter of the ball screw device and the outside diameter of the rack shaft is set to be equal to or larger than the difference between the bore diameter of a ball screw nut and the diameter. The thickness center diameter of the retainer is set to be smaller than the diameter. Even when the inclination angle is reduced, the clearance between the inclined surfaces of each retainer groove on the radial inside can be easily set to be smaller than the diameter of the balls because the bore diameter of the retainer is set to be smaller. Thus, even when the inclination angle of the inclined surfaces is set to be smaller, the balls can be properly retained.

8 Claims, 4 Drawing Sheets

(51) Int. Cl.
*B62D 3/08* (2006.01)
*B62D 5/04* (2006.01)
*B62D 3/02* (2006.01)
*B62D 3/04* (2006.01)
*B62D 3/06* (2006.01)
*F16H 25/18* (2006.01)
*F16H 25/20* (2006.01)

(52) U.S. Cl.
CPC .......... *F16H 25/22* (2013.01); *F16H 25/2204* (2013.01); *F16H 25/2214* (2013.01)

(56) References Cited

FOREIGN PATENT DOCUMENTS

| EP | 1602858 A1 | * | 12/2005 | ......... F16H 25/2204 |
|----|------------|---|---------|------------------------|
| JP | 2003-97667 A | | 4/2003 | |
| JP | 2003097667 A | * | 4/2003 | |
| JP | 2009-257369 A | | 11/2009 | |

* cited by examiner

BALL SCREW DEVICE AND STEERING SYSTEM

INCORPORATION BY REFERENCE

The disclosure of Japanese Patent Application No. 2016-107442 filed on May 30, 2016 including the specification, drawings and abstract, is incorporated herein by reference in its entirety.

BACKGROUND OF THE INVENTION

1. Field of the Invention

The present invention relates to a ball screw device and a steering system.

2. Description of the Related Art

As a conventional electric power steering system (EPS), an EPS is known that uses a ball screw device to convert rotational torque of a motor into a linear motion of a rack shaft, thereby assisting a driver in steering operation.

In such a ball screw device, a ball screw nut that is rotated by a motor is screwed onto a rack shaft via balls. In conjunction with rotation of the ball screw nut, the balls roll while rotating in the same direction as the ball screw nut rotates, between the ball screw nut and the rack shaft. If adjacent balls come into contact with each other during rolling of the balls, sliding resistance is generated between the adjacent balls, which may cause the rotational torque of the ball screw device to fluctuate. In view of this, a ball screw device of a steering system described in Japanese Patent Application Publication No. 2009-257369 is provided with a cylindrical retainer (cage) having retainer grooves that retain balls in a rollable manner in order to prevent adjacent balls from coming into contact with each other. Inner surfaces of each retainer groove that face each other in the circumferential direction are inclined so as to be separated from each other toward the radial outside of the retainer groove. Thus, movement of the balls toward the radial outside of the retainer grooves is allowed, but movement thereof toward the radial inside of the retainer grooves is restricted.

In order to facilitate processing of the retainer grooves, the angle of inclination of the inner surfaces of each retainer groove is desired to be smaller. However, when the angle of inclination of the inner surfaces of each retainer groove is set to be smaller, time and labor to process the inner surfaces of the retainer grooves can be reduced, but it is difficult for the balls to ride on the retainer, and it is difficult for the retainer to retain the balls in the radial direction of the retainer. The reason for the reduction of time and labor to process the inner surfaces of the retainer grooves is that a smaller inclination angle of the inner surfaces of the retainer grooves requires fewer machining processes such as cutting of inclined surfaces thereof.

SUMMARY OF THE INVENTION

An object of the present invention is to provide a ball screw device and a steering system including a retainer that can properly retain balls with retainer grooves each having both circumferential side surfaces with a smaller inclination angle.

A ball screw device according to one aspect of the present invention includes: a ball screw shaft having an outer peripheral surface on which a ball rolling groove is spirally formed; a ball screw nut having an inner peripheral surface on which a ball rolling groove is spirally formed; a plurality of balls provided between the ball rolling groove of the ball screw shaft and the ball rolling groove of the ball screw nut; and a retainer that is disposed between the ball screw shaft and the ball screw nut and on which a retainer groove that retains the balls in a rollable manner is formed. A pair of inner surfaces of the retainer groove that face each other in a circumferential direction of the retainer have inclined surfaces the distance between which in the circumferential direction increases as the inclined surfaces extend radially outward. A pitch circle diameter of a ball screw including the ball screw shaft, the ball screw nut, and the balls is set to be larger than a center diameter that is a diameter of a center position in radial thickness of the retainer. A difference when an outside diameter of the ball screw shaft is subtracted from the pitch circle diameter of the ball screw is set to be equal to or larger than a difference when the pitch circle diameter of the ball screw is subtracted from a bore diameter of the ball screw nut.

With this configuration, the difference between the pitch circle diameter of the ball screw and the outside diameter of the ball screw shaft is set to be equal to or larger than the difference between the bore diameter of the ball screw nut and the pitch circle diameter of the ball screw. Thus, even when the inclination angle of the inclined surfaces in the circumferential direction of the retainer groove of the retainer is small, the retainer can properly retain the balls. This is because the retainer is positioned closer to the central axis of the ball screw shaft, whereby the shortest distance between the two inclined surfaces can be more easily set to be smaller than the diameter of the balls.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
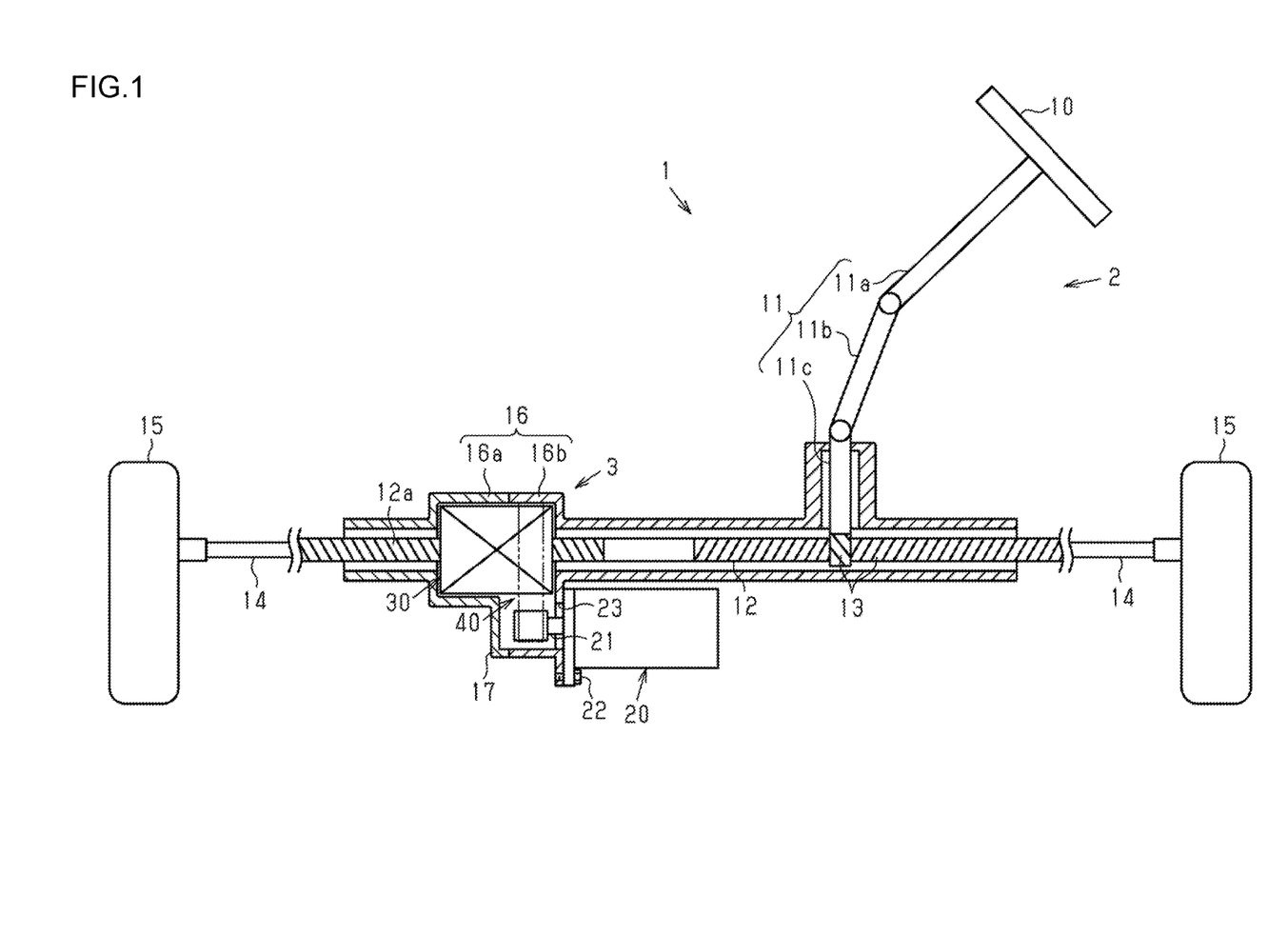
FIG. 1 is a configuration diagram illustrating a schematic configuration of a steering system according to one embodiment.

The following describes a ball screw device according to one embodiment of the present invention and an electric power steering system (EPS) that is one of steering systems using this device. As depicted in FIG. 1, the EPS 1 includes a steering mechanism 2 that steers steered wheels 15 in response to driver's operation of a steering wheel 10 and an assist mechanism 3 that assists a driver in steering operation.

The steering mechanism 2 includes the steering wheel 10 and a steering shaft 11 that rotates integrally with the steering wheel 10. The steering shaft 11 includes a column shaft 11a coupled to the steering wheel 10, an intermediate shaft 11b coupled to a lower-end portion of the column shaft 11a, and a pinion shaft 11c coupled to a lower-end portion of the intermediate shaft 11b. A lower-end portion of the pinion shaft 11c is coupled to a rack shaft 12 via rack-and-pinion mechanism 13. The rack shaft 12 has a ball screw shaft and rack teeth in axially different positions. The lower-end portion (pinion teeth) of the pinion shaft 11c meshes with the rack shaft 12 (rack teeth). Thus, rotational motion of the steering shaft 11 is converted into reciprocating linear motion of the rack shaft 12 in an axial direction (lateral direction in FIG. 1) via the rack-and-pinion mechanism 13 including the pinion teeth formed on the distal end of the pinion shaft 11c and the rack teeth formed on the rack shaft 12. This reciprocating linear motion is transmitted to the right and left steered wheels 15 via tie rods 14 that are each coupled to both ends of the rack shaft 12, whereby the steered angle of the steered wheels 15 is changed.

The assist mechanism 3 is provided around the rack shaft 12. The assist mechanism 3 includes a motor 20 that is a source of generating assist force, a ball screw device 30 integrally attached around the rack shaft 12, and a speed reducer 40 that transmits rotational force of a rotary shaft 21 of the motor 20 to the ball screw device 30. The assist mechanism 3 converts the rotational force of the rotary shaft 21 of the motor 20 into force of the rack shaft 12 in the axial direction via the speed reducer 40 and the ball screw device 30, thereby assisting the driver in steering operation.

The ball screw device 30, the speed reducer 40, the pinion shaft 11c, and the rack shaft 12 are covered by a rack housing 16. The rack housing 16 is divided near the assist mechanism 3 in the axial direction of the rack shaft 12 into a first rack housing 16a and a second rack housing 16b, and is composed by coupling the first rack housing 16a and the second rack housing 16b to each other. The rack housing 16 includes a speed-reducer housing 17 that is provided so as to protrude in a direction (downward in FIG. 1) intersecting the extending direction of the rack shaft 12. In the speed-reducer housing 17, part of the speed reducer 40 is housed. In a wall of the speed-reducer housing 17, a through hole 23 is formed. The rotary shaft 21 of the motor 20 extends to the inside of the speed-reducer housing 17 through the through hole 23 formed in the speed-reducer housing 17. The motor 20 is fixed to the speed-reducer housing 17 with a bolt 22 such that the rotary shaft 21 is positioned parallel to the rack shaft 12.

Figure 2:
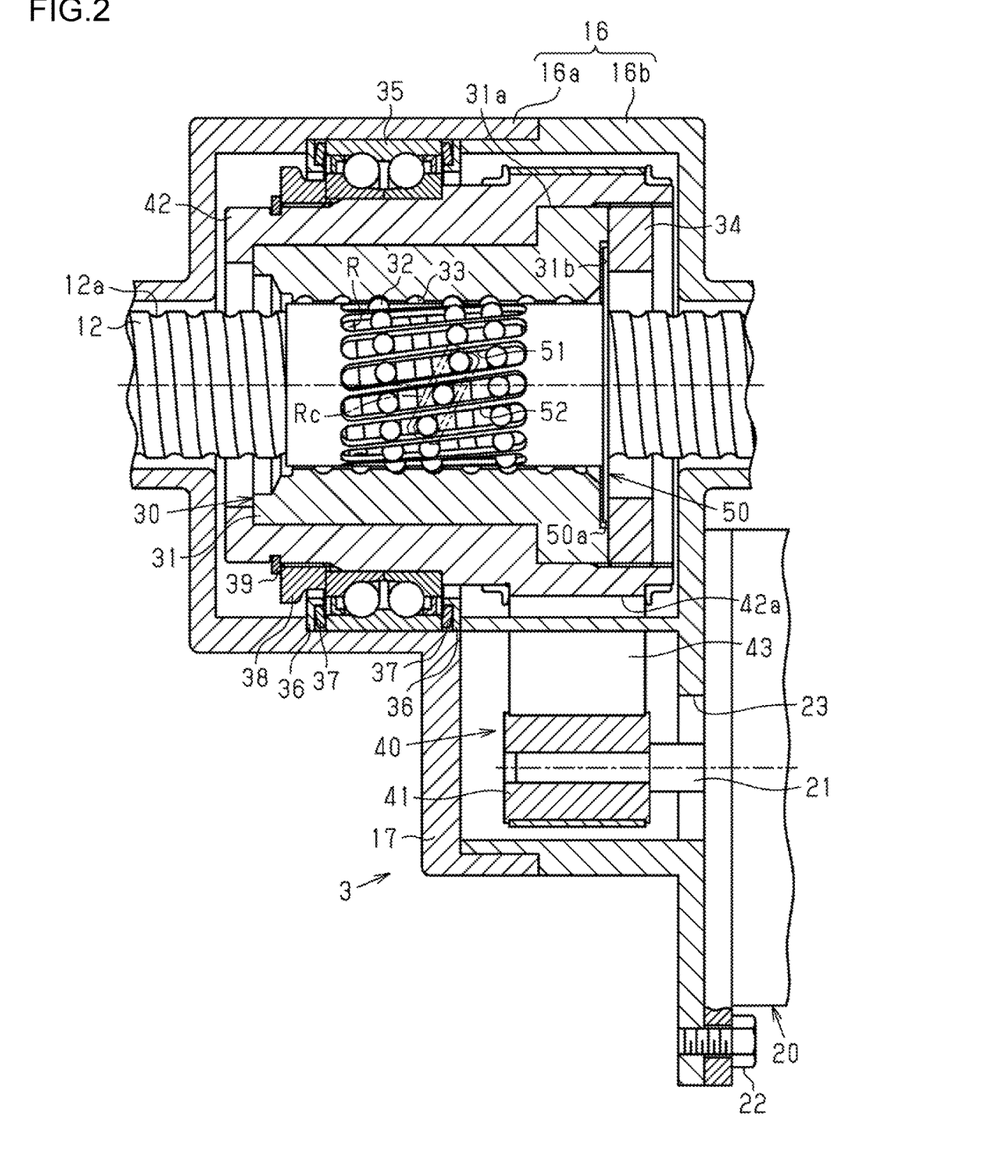
FIG. 2 is a sectional view illustrating a schematic structure of an assist mechanism in the steering system according to the embodiment.

The following describes the assist mechanism 3 in detail. As depicted in FIG. 2, the ball screw device 30 includes a cylindrical ball screw nut 31 that is screwed to the rack shaft 12 via a plurality of balls 32. The speed reducer 40 includes a drive pulley 41 integrally attached to the rotary shaft 21 of the motor 20, a driven pulley 42 integrally attached to the outer periphery of the ball screw nut 31, and a belt 43 wound between the drive pulley 41 and the driven pulley 42. On the outer peripheral surface of a first end portion (right end of the ball screw nut 31 in FIG. 2) of the ball screw nut 31, a flange portion 31a is formed over the entire area in the circumferential direction. The flange portion 31a is sandwiched between a cylindrical lock screw 34 that is screwed into an inner periphery of an end portion of the driven pulley 42 and a step portion formed on an inner periphery of the driven pulley 42, whereby the ball screw nut 31 is attached to the driven pulley 42 in an integrally rotatable manner. On an outer peripheral surface of the driven pulley 42, a bearing 35 is provided that supports the driven pulley 42 and the ball screw nut 31 rotatably with respect to an inner peripheral surface of the rack housing 16. As the belt 43, for example, a rubber toothed belt (helically toothed belt) including a core wire is used.

On an outer peripheral surface of the rack shaft 12, a spiral thread groove 12a is formed. On an inner peripheral surface of the ball screw nut 31, a spiral thread groove 33 corresponding to the thread groove 12a of the rack shaft 12 is formed. A spiral space surrounded by the thread groove 33 of the ball screw nut 31 and the thread groove 12a of the rack shaft 12 functions as a rolling passage R in which the balls 32 roll. In the ball screw nut 31, a circulation passage Rc is formed that is open to two points in the rolling passage R and serves as a shortcut connecting the two points. Thus, the balls 32 can endlessly circulate through the rolling passage R via the circulation passage Rc in the ball screw nut 31. As the circulation passage Rc, that of a deflector type allowing circulation for each row, for example, is used.

The bearing 35 is supported so as to be movable in the axial direction with respect to the rack housing 16. On both axial sides of the outer ring of the bearing 35, annular plates 36 each having an L-shaped cross-section are provided, and a disc spring 37 is provided between each plate 36 and the outer ring of the bearing 35. The inner ring of the bearing 35 is sandwiched between a step portion in the axial direction of a flange portion 42a formed on an outer peripheral surface of the driven pulley 42 and an annular fixing member 38 screwed onto an outer periphery of an end portion of the driven pulley 42. By a snap ring 39 fitted onto an outer periphery of the end portion of the driven pulley 42, the fixing member 38 is prevented from moving in the axial direction with respect to the driven pulley 42.

In the assist mechanism 3 thus configured, when the rotary shaft 21 of the motor 20 rotates, the drive pulley 41 rotates integrally with the rotary shaft 21. Rotation of the drive pulley 41 is transmitted to the driven pulley 42 via the belt 43, whereby the driven pulley 42 is rotated. Thus, the ball screw nut 31 that is integrally attached to the driven pulley 42 also rotates integrally. Because the ball screw nut 31 rotates relative to the rack shaft 12, the balls 32 interposed between the ball screw nut 31 and the rack shaft 12 endlessly circulate through the rolling passage R while being loaded from both sides. The balls 32 roll in the rolling passage R, whereby the rotational torque applied to the ball screw nut 31 is converted into force that is applied to the rack shaft 12 in the axial direction. Thus, the rack shaft 12 moves in the axial direction with respect to the ball screw nut 31. This axial force applied to the rack shaft 12 serves as assist force to assist the driver in steering operation.

Between the rack shaft 12 and the ball screw nut 31, a substantially cylindrical retainer 50 is provided. The retainer 50 has a plurality of retainer grooves 51 that retain the balls 32 in a rollable manner. The retainer grooves 51 each have an elongated-hole shape that extends at a certain angle with respect to the axis of the rack shaft 12. The retainer grooves 51 are formed at regular intervals in the circumferential direction of the retainer 50. The width of each separating portion 52 that is a portion between adjacent retainer grooves 51 in the circumferential direction of the retainer 50 and separates these retainer grooves 51 in the circumferential direction is sufficiently smaller than the diameter of the balls 32. Each retainer groove 51 forms a right angle with the thread groove 12a of the rack shaft 12 and with the thread groove 33 of the ball screw nut 31. In other words, each retainer groove 51 is formed so as to be inclined by the lead angle of the thread groove 12a and the thread groove 33 with respect to the axis of the rack shaft 12 and be perpendicular to the thread groove 12a and the thread groove 33.

On a first end portion (right end in FIG. 2) of the retainer 50, a flange portion 50a is formed. On an inner surface of the ball screw nut 31, an accommodating portion 31b that accommodates the flange portion 50a is formed. In the axial direction of the rack shaft 12, the length of the accommodating portion 31b is slightly longer than the length (thickness) of the flange portion 50a. The bore diameter of the accommodating portion 31b is slightly larger than the outside diameter of the flange portion 50a. With the flange portion 50a accommodated in the accommodating portion 31b, the lock screw 34 is tightened to a position to come into contact with the right end surface of the ball screw nut 31 (flange portion 31a), whereby movement of the retainer 50 in the axial direction is restricted. In at least one of the portion between the flange portion 50a and the ball screw nut 31 and the portion between the flange portion 50a and the lock screw 34, a little clearance is formed in the axial direction of the rack shaft 12. Between the outer peripheral surface of the flange portion 50a and the inner peripheral surface of the accommodating portion 31b, a clearance is formed in the radial direction. This allows the flange portion 50a to rotate relative to the ball screw nut 31 and the lock screw 34.

Figure 3:
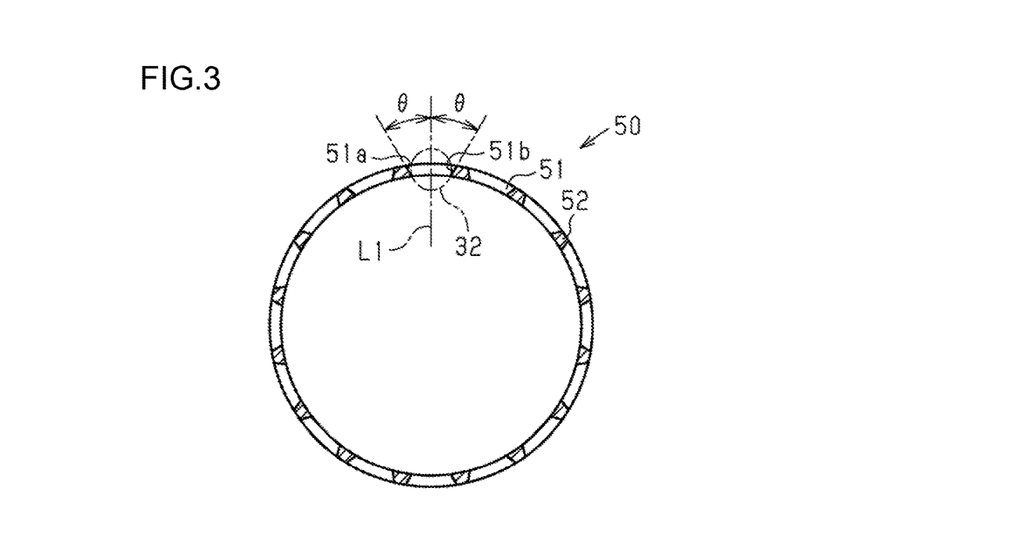
FIG. 3 is a sectional view illustrating a cross-section of a retainer in the axial direction thereof.
Figure 4:
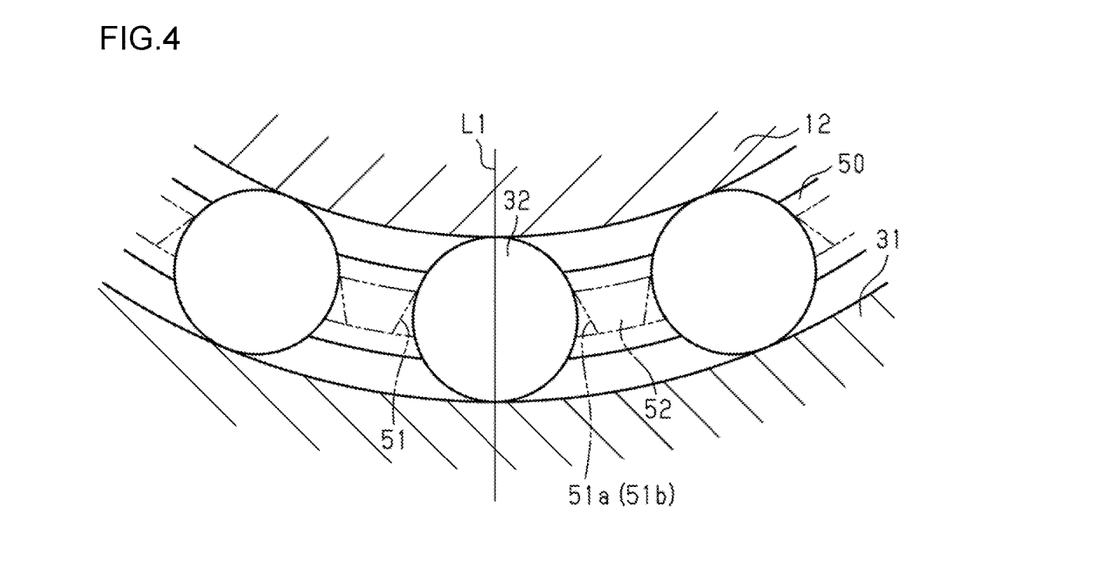
FIG. 4 is a sectional view illustrating a schematic structure of the retainer that retains balls in the axial direction of the retainer.

As depicted in FIG. 3, on a pair of inner surfaces of each retainer groove 51 that face each other in the circumferential direction of the retainer 50, inclined surfaces 51a and 51b are formed. The inclined surfaces 51a and 51b are inclined such that the distance therebetween in the circumferential direction of the retainer 50 increases toward the radial outside of the retainer 50. When viewed from the axial direction of the retainer 50, the inclined surfaces 51a and 51b each form an inclination angle θ with a straight line L1 extending in a direction orthogonal to the axis of the retainer 50. The inclination angle θ of the inclined surfaces 51a and 51b is set such that the width of the retainer groove 51 in the circumferential direction is smaller than the diameter of the balls 32 in the inner periphery of the retainer 50 and is greater than the diameter of the balls 32 in the outer periphery of the retainer 50. By this setting, movement of the balls 32 toward the radial outside of the retainer grooves 51 is allowed, but movement thereof toward the radial inside of the retainer grooves 51 is restricted. The inclined surfaces 51a and 51b of the retainer grooves 51 are in contact with the balls 32, whereby movement of the retainer 50 in the radial direction is restricted. As depicted in FIG. 4, the retainer 50 is supported by the balls 32, whereby the retainer 50 is prevented from coming into contact with an outer peripheral surface of the rack shaft 12 and an inner peripheral surface of the ball screw nut 31.

Figure 5:
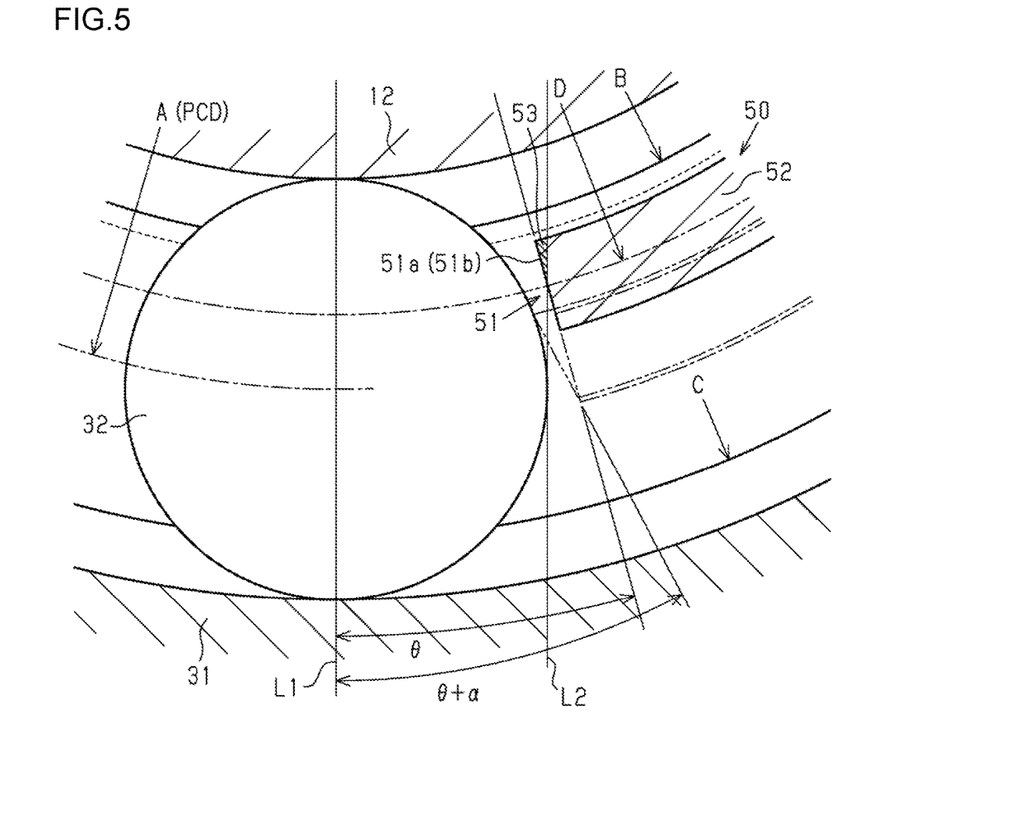
FIG. 5 is a schematic diagram illustrating a dimensional relation between the respective components of a rack shaft, each ball, a ball screw nut, and the retainer in the axial direction of the retainer.

As depicted in FIG. 5, the pitch circle diameter (PCD) of the ball screw device 30 (ball screw including the rack shaft 12, the ball screw nut 31, and the balls 32) is a diameter A. The diameter A is about one half of the sum of the root diameter of the thread groove 12a of the rack shaft 12 and the root diameter of the thread groove 33 of the ball screw nut 31. In other words, the diameter A is equal to twice the distance from the central axis of the rack shaft 12 to the center of each ball 32.

The outside diameter B (specifically, the outside diameter of the thread ridge of the rack shaft 12) of the rack shaft 12 is smaller than the diameter A. The bore diameter C (specifically, the bore diameter of the thread ridge of the ball screw nut 31) of the ball screw nut 31 is set to be larger than the diameter A and the outside diameter B.

The difference between the diameter A that is the pitch circle diameter of the ball screw device 30 and the outside diameter B of the rack shaft 12 is set to be equal to or larger than the difference between the bore diameter C of the ball screw nut 31 and the diameter A (A−B≥C−A). The diameter D of the radial (thickness) center of the retainer 50 is set to be smaller than the diameter A (D<A). This center diameter D is twice the distance from the central axis of the rack shaft 12 to the center position in the thickness direction of the retainer 50. The center diameter D is set to be larger than the outside diameter B and smaller than the bore diameter C. The center diameter D is preferably set to be equal to or smaller than one half of the sum of the outside diameter B and the bore diameter C (D≤(B+C)/2). This is because the inner peripheral surface of the retainer 50 is preferably closer to the outer peripheral surface of the rack shaft 12. The reason for this will be described later. For example, in order to position the inner peripheral surface of the retainer 50 closer to the outer peripheral surface of the rack shaft 12, the diameter (bore diameter) of the retainer 50 is set to be smaller to the extent that contact with the rack shaft 12 can be prevented. The retainer 50 may be positioned still closer to the rack shaft 12 by slightly lowering the thread ridge formed on the outer peripheral surface of the rack shaft 12.

An end portion 53 of each separating portion 52 (a portion including an edge of the separating portion 52 at an opening on the smaller-diameter side) is positioned on the ball 32 side with respect to a tangent L2 to the corresponding ball 32 extending in the vertical direction in FIG. 5. In other words, the end portion 53 is an inner peripheral portion, in the separating portion 52, that is formed such that the width of the corresponding retainer groove 51 in the circumferential direction is smaller than the diameter of the ball 32. When the retainer 50 moves downward (and upward) in FIG. 5, the end portion 53 comes into contact with the ball 32.

Figure 6:
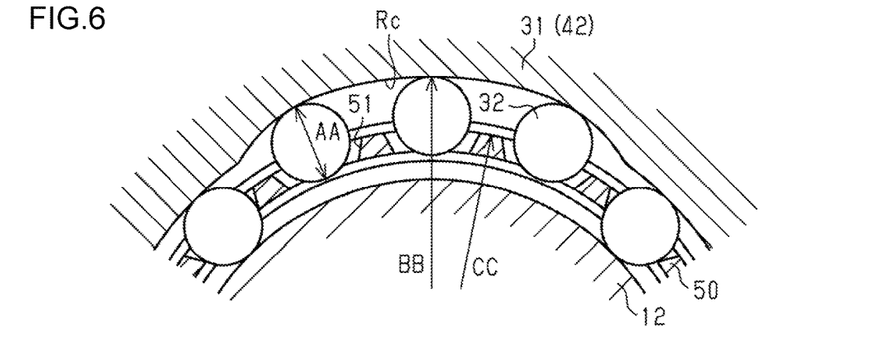
FIG. 6 is a sectional view illustrating a schematic structure of the retainer that retains the balls near a circulation passage in the axial direction of the retainer.

As depicted in FIG. 6, even near the circulation passage Rc, the retainer 50 separates the balls 32 from each other in the circumferential direction. The diameter of the balls 32 is a diameter AA. The inner radius of the inner surface of the circulation passage Rc in the ball screw nut 31 at a portion where this inner radius becomes largest is an inner radius BB. In other words, the inner radius BB is the largest value of the distance from the central axis of the rack shaft 12 to the inner surface of the circulation passage Rc. The outer radius of the retainer 50 is an outer radius CC.

There is a relation among the diameter AA, the inner radius BB, and the outer radius CC, in which the diameter AA is larger than the difference between the inner radius BB and the outer radius CC (AA>BB−CC). By this relation, even if a ball 32 overrides the thread ridge of the rack shaft 12 in a deflector when passing through the circulation passage Rc, the ball 32 can be prevented from falling off the corresponding retainer groove 51 of the retainer 50, and thus the retainer 50 can continue to retain the ball 32. Even when a ball 32 is passing through the circulation passage Rc, the separating portions 52 prevent the adjacent balls 32 from coming into contact with each other.

The following describes functions and effects of the present embodiment. In FIG. 5, a retainer of a first comparative example indicated by the long dashed double-short dashed line, a retainer of a second comparative example indicated by a long dashed short dashed line, and the retainer of the present embodiment indicated by a continuous line are illustrated, in which the inclination angle and dimensions, for example, are exaggerated for the purpose of easy explanation. For the purpose of easy explanation, only a first inclined surface of the inclined surfaces 51a and 51b is illustrated, and a second inclined surface thereof has a shape symmetrical with respect to the straight line L1.

The inclination angle (e.g., the inclination angle θ) of the retainer of the comparative example indicated by the long dashed short dashed line is smaller than the inclination angle (e.g., the inclination angle θ+α) of the retainer indicated by the long dashed double-short dashed line. Thus, processing of the retainer grooves 51 is easier in the retainer indicated by the long dashed short dashed line than in the retainer indicated by the long dashed double-short dashed line because processing of the inclined surfaces 51a and 51b is easier. This is because, for example, a larger inclination angle requires the inclined surfaces to be ground by a larger amount during processing of the retainer grooves 51. However, if the inclination angle θ of the inclined surfaces 51a and 51b is simply reduced, specifically if the inclination angle of the inclined surfaces 51a and 51b is set to the inclination angle θ that is smaller than the inclination angle θ+α by the angle α, it is difficult for the retainer grooves 51 of the retainer 50 to retain the balls 32 in the radial direction of the retainer. In other words, in the retainer of the comparative example indicated by the long dashed short dashed line, the space (clearance) in the circumferential direction between radially inner portions of the inclined surfaces 51a and 51b may be larger than the diameter of the balls 32. In this case, the balls 32 may fall off the retainer grooves 51 of the retainer 50, and thus the retainer 50 may fail to retain the balls 32.

In this regard, in the present embodiment, as indicated by the continuous line, while the inclined surfaces 51a and 51b each have the inclination angle θ, the bore diameter (outside diameter) of the retainer 50 is set to be smaller, which allows the space in the circumferential direction between the radially inner portions of the inclined surfaces 51a and 51b to be set to be smaller than the diameter of the balls 32. Thus, the balls 32 can be prevented from falling off the retainer grooves 51 of the retainer 50, and the retainer 50 can retain the balls 32.

Because the inclined surfaces 51a and 51b each have an angle closer to a right angle with respect to the rolling direction of the balls 32 as the angle of the inclined surfaces 51a and 51b decreases, the balls 32 can be prevented from overriding the retainer 50. In other words, because the inclined surfaces 51a and 51b of the retainer grooves 51 are not inclined surfaces each forming a gentle angle with respect to the rolling direction of the balls 32, the balls 32 can be prevented from gradually overriding the inclined surfaces 51a and 51b. The fact that it is difficult for the balls 32 to override the inclined surfaces 51a and 51b could mean that it is difficult for the inclined surfaces 51a and 51b to retain the balls 32 in the radial direction of the retainer 50. However, in the present embodiment, with the configuration described above, the capability of the retainer 50 to retain the balls 32 is maintained.

The following describes the points of processing that will be facilitated with the retainer grooves 51. For example, when the retainer 50 is produced by rolling up a sheet material, the rough shape of the retainer grooves 51 can be formed in the retainer 50 by punching out the sheet material in the thickness direction before rolling up the sheet material. Subsequently, the inclined surfaces 51a and 51b are processed by grinding the inner surfaces of the retainer grooves 51. In the present embodiment, the inclination angle of the inclined surfaces 51a and 51b is set to be smaller, and accordingly the amount of grinding the inner surfaces of the retainer grooves 51 is smaller (or the grinding is not necessary), which facilitates processing of the retainer grooves 51.

The present embodiment may be modified as follows. Other embodiments below may be combined with each other unless a technical contradiction arises.

In the present embodiment, the ball screw device 30 including the circulation passage Rc of a deflector type is used, but the present invention is not limited to this. For example, a ball screw device including a circulation passage Rc of an end-deflector type may be used. Alternatively, a ball screw device 30 of a non-circulation type may be used.

As the processing of forming a predetermined inclination on the inclined surfaces 51a and 51b, plastic working may be used.

In the present embodiment, the present invention is embodied in the EPS 1 that is configured to apply the assist force to the rack shaft 12 by the motor 20 having the rotary shaft 21 disposed parallel to the rack shaft 12, but the present invention is not limited to this. The present invention may be embodied in any steering system including the ball screw device 30 that converts the rotational motion of the motor 20 into a linear motion of the rack shaft 12 in the axial direction. Although the electric power steering system that uses the rotational force of the motor 20 to assist the linear motion of the rack shaft 12 in conjunction with steering operation has been exemplified, the present invention may be applied to a steer-by-wire (SBW) steering system. The steer-by-wire (SBW) steering system may be of either one of a type including a pinion shaft and a type including no pinion shaft. When being embodied in an SBW steering system, the present invention may be embodied not only as a front-wheel steering system, but also as a rear-wheel steering system or a four-wheel steering system (4WS). In other words, any one of these steering systems only needs to include the ball screw device 30 that converts a rotational motion applied thereto into a linear motion.

In the respective embodiments, the present invention has been embodied in the EPS 1 including the ball screw device 30, but the present invention is not limited to this. For example, the ball screw device 30 may be embodied in a machine tool, or the present invention may be embodied in a machine including a movable unit that rotates a ball screw nut thereby linearly moving a ball screw shaft.

What is claimed is:

1. A ball screw device comprising:
a ball screw shaft having an outer peripheral surface on which a ball rolling groove is spirally formed;
a ball screw nut having an inner peripheral surface on which a ball rolling groove is spirally formed;
a plurality of balls provided between the ball rolling groove of the ball screw shaft and the ball rolling groove of the ball screw nut; and
a retainer that is disposed between the ball screw shaft and the ball screw nut and on which a retainer groove that retains the balls in a rollable manner is formed, wherein
a pair of inner surfaces of the retainer groove that face each other in a circumferential direction of the retainer have inclined surfaces a distance between which in the circumferential direction increases as the inclined surfaces extend radially outward,
a pitch circle diameter of a ball screw including the ball screw shaft, the ball screw nut, and the balls is set to be larger than a center diameter that is a diameter of a center position in radial thickness of the retainer, and
a difference obtained when an outside diameter of the ball screw shaft is subtracted from the pitch circle diameter of the ball screw is set to be equal to or larger than a difference obtained when the pitch circle diameter of the ball screw is subtracted from a bore diameter of the ball screw nut.

2. The ball screw device according to claim 1, wherein the center diameter is set to be equal to or smaller than one half of a sum of the outside diameter of the ball screw shaft and the bore diameter of the ball screw nut.

3. The ball screw device according to claim 1, wherein in the ball screw nut, a circulation passage is formed that is open to two points in a rolling passage between the ball rolling groove formed on the ball screw shaft and the ball rolling groove formed on the ball screw nut, and serves as a shortcut connecting the two points, and a diameter of the balls is set to be larger than a difference obtained when an outer radius of the retainer is subtracted from a maximum value of a distance between a central axis of the ball screw shaft and an inner surface of the circulation passage.

4. A steering system comprising:
the ball screw device as claimed in claim 1.

5. A ball screw device comprising:
a ball screw shaft having an outer peripheral surface on which a ball rolling groove is spirally formed;
a ball screw nut having an inner peripheral surface on which a ball rolling groove is spirally formed;
a plurality of balls provided between the ball rolling groove of the ball screw shaft and the ball rolling groove of the ball screw nut; and
a retainer that is disposed between the ball screw shaft and the ball screw nut and on which a retainer groove that retains the balls in a rollable manner is formed, wherein a pair of inner surfaces of the retainer groove that face each other in a circumferential direction of the retainer have inclined surfaces a distance between which in the circumferential direction increases as the inclined surfaces extend radially outward, a pitch circle diameter of a ball screw including the ball screw shaft, the ball screw nut, and the balls is set to be larger than a center diameter that is a diameter of a center position in radial thickness of the retainer, and a difference obtained when an outside diameter of the ball screw shaft is subtracted from the pitch circle diameter of the ball screw is set to be larger than a difference obtained when the pitch circle diameter of the ball screw is subtracted from a bore diameter of the ball screw nut.

6. The ball screw device according to claim 5, wherein the center diameter is set to be equal to or smaller than one half of a sum of the outside diameter of the ball screw shaft and the bore diameter of the ball screw nut.

7. The ball screw device according to claim 5, wherein in the ball screw nut, a circulation passage is formed that is open to two points in a rolling passage between the ball rolling groove formed on the ball screw shaft and the ball rolling groove formed on the ball screw nut, and serves as a shortcut connecting the two points, and a diameter of the balls is set to be larger than a difference obtained when an outer radius of the retainer is subtracted from a maximum value of a distance between a central axis of the ball screw shaft and an inner surface of the circulation passage.

8. A steering system comprising:
the ball screw device as claimed in claim 5.

* * * * *